United States Patent
Hammer et al.

(10) Patent No.: US 8,234,370 B2
(45) Date of Patent: Jul. 31, 2012

(54) DETERMINING WEB ANALYTICS INFORMATION

(75) Inventors: Elizabeth R. Hammer, Atlanta, GA (US); Stephen C. Hammer, Atlanta, GA (US)

(73) Assignee: International Business Machines Corporation, Armonk, NY (US)

( * ) Notice: Subject to any disclaimer, the term of this patent is extended or adjusted under 35 U.S.C. 154(b) by 602 days.

(21) Appl. No.: 12/494,636

(22) Filed: Jun. 30, 2009

(65) Prior Publication Data

US 2010/0332962 A1 Dec. 30, 2010

(51) Int. Cl.
*G06F 15/173* (2006.01)

(52) U.S. Cl. .................................. 709/224; 709/223

(58) Field of Classification Search .............. 709/224, 709/223
See application file for complete search history.

(56) References Cited

U.S. PATENT DOCUMENTS

| | | | |
|---|---|---|---|
| 6,877,137 B1 | 4/2005 | Rivette et al. | |
| 7,079,111 B2 * | 7/2006 | Ho | 345/156 |
| 7,941,525 B1 * | 5/2011 | Yavilevich | 709/224 |
| 8,095,673 B2 * | 1/2012 | Nandy et al. | 709/229 |
| 2003/0217333 A1 * | 11/2003 | Smith et al. | 715/513 |
| 2006/0184410 A1 * | 8/2006 | Ramamurthy et al. | 705/8 |
| 2006/0253345 A1 * | 11/2006 | Heber | 705/27 |
| 2007/0011304 A1 * | 1/2007 | Error | 709/224 |
| 2008/0046562 A1 * | 2/2008 | Butler | 709/224 |
| 2008/0052278 A1 | 2/2008 | Zlotin et al. | |
| 2009/0100154 A1 * | 4/2009 | Stevenson et al. | 709/220 |
| 2009/0287713 A1 * | 11/2009 | Anderson et al. | 707/10 |

FOREIGN PATENT DOCUMENTS

| | | |
|---|---|---|
| WO | 2004079551 A2 | 9/2004 |
| WO | 2005052755 A2 | 6/2005 |

OTHER PUBLICATIONS

IBM. Short Term Uniform Resource Locator Bookmarks with Referencing. IPCOM000129265D, Original Publication Date: Oct. 4, 2005. 1 page.
IBM TDB. Web Analytics: Correlating FTP Traffic to HTTP Sessions. IPCOM000018063D, Original Publication Date: Jun. 15, 2002. IP.com Publication Date: Jun. 21, 2003. 2 pages.

* cited by examiner

*Primary Examiner* — Hieu Hoang
(74) *Attorney, Agent, or Firm* — Schmeiser, Olsen & Watts; Anna Linne

(57) ABSTRACT

A system and associated method for determining web analytics information. A Hypertext Transfer Protocol (HTTP) request for a target page referred from a referring page by a mouse click is processed to calculate web analytics data in the target page. The web analytics data regarding a mouse cursor position, a 2-dimensional information of the target page, and the URL of the referring page is transmitted to a web analytics server to generate the web analytics information for the referring page in format of a heat map of the referring page.

20 Claims, 7 Drawing Sheets

HEAT MAP OF 21E

USER CLICK LOCATIONS

DETERMINING WEB ANALYTICS INFORMATION

BACKGROUND OF THE INVENTION

The present invention discloses a system and associated method for determining web analytics information of a web page. Conventional methods require additional process of the web page for collecting and processing web analytics information. Conventional methods provide only primitive information as to linked web pages or a click count.

BRIEF SUMMARY

According to one embodiment of the present invention, a method for determining web analytics information comprises loading a target page in a web browser upon receiving a Hypertext Transfer Protocol (HTTP) request for a Uniform Resource Locator (URL) of the target page, determining that the HTTP request further comprises a URL of a referring page, wherein said referring page comprises a hypertext link representing the URL of the target page, and wherein said hyper text link had been activated by a mouse click such that the target page was loaded in said loading, a processor of a computer system calculating web analytics data comprising a (X, Y) position of a mouse cursor within the target page, a tuple (width, height) indicating 2-dimensional size of the target page, and the URL of the referring page, and transmitting the calculated web analytics data to a web analytics server executing on another computer system coupled to the computer system through a communication network such that the transmitted web analytics data are utilized to generate said web analytics information that describes properties of hyperlink positions in the referring page.

According to one embodiment of the present invention, a computer program product comprises a computer readable memory unit that embodies a computer readable program code. The computer readable program code contains instructions that, when executed by a processor of a computer system, implement determining web analytics information.

According to one embodiment of the present invention, a computer system comprises a processor and a computer readable memory unit coupled to the processor, wherein the computer readable memory unit containing instructions that, when executed by the processor, implement determining web analytics information.

According to one embodiment of the present invention, a process for supporting computer infrastructure, said process comprising providing at least one support service for at least one of creating, integrating, hosting, maintaining, and deploying computer-readable code in a computing system, wherein the code in combination with the computing system is capable of performing the method for determining web analytics information

DETAILED DESCRIPTION

Figure 1A:
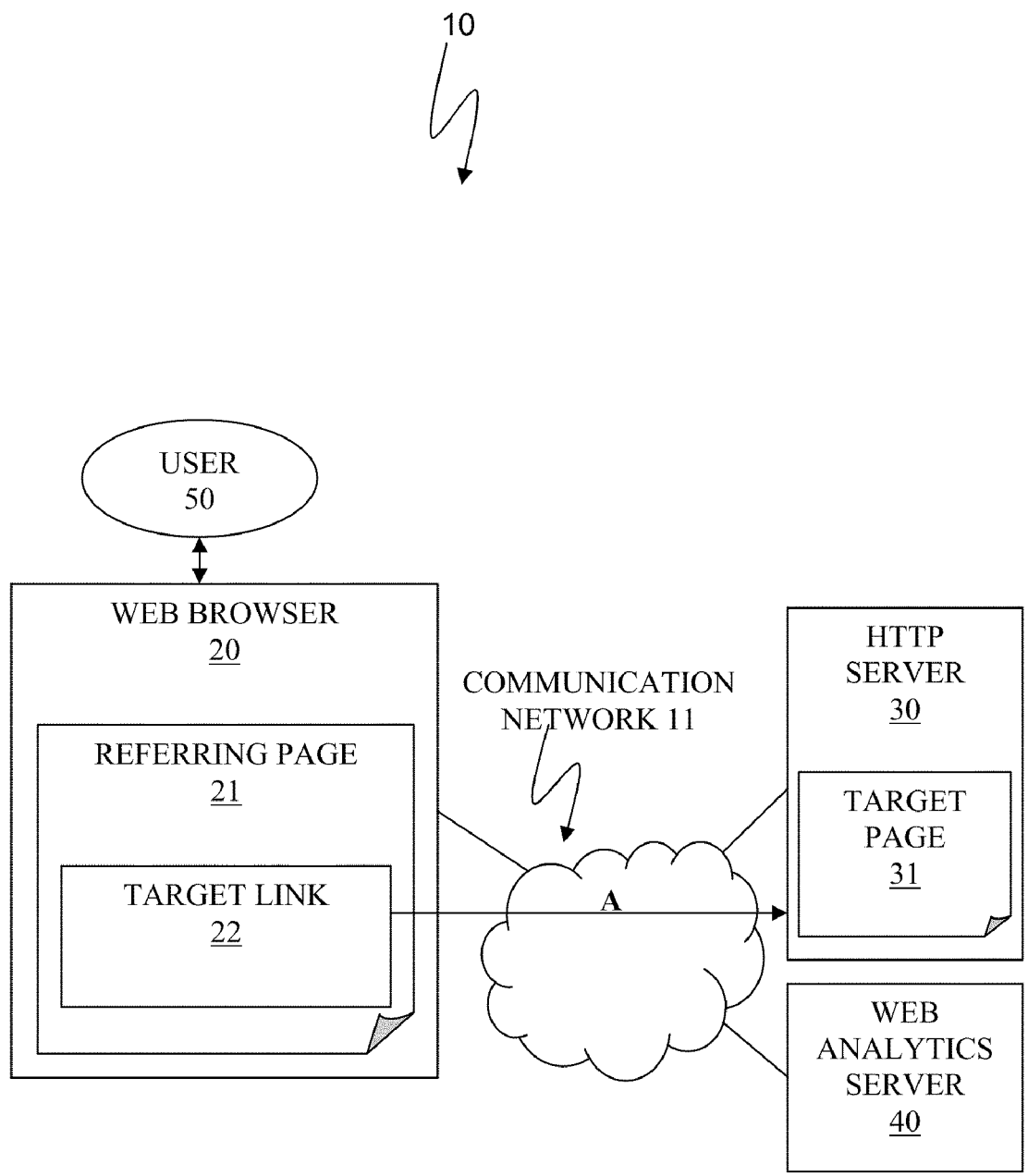
FIGS. 1A and 1B illustrate a system for determining web analytics information, in accordance with embodiments of the present invention.
Figure 1B:
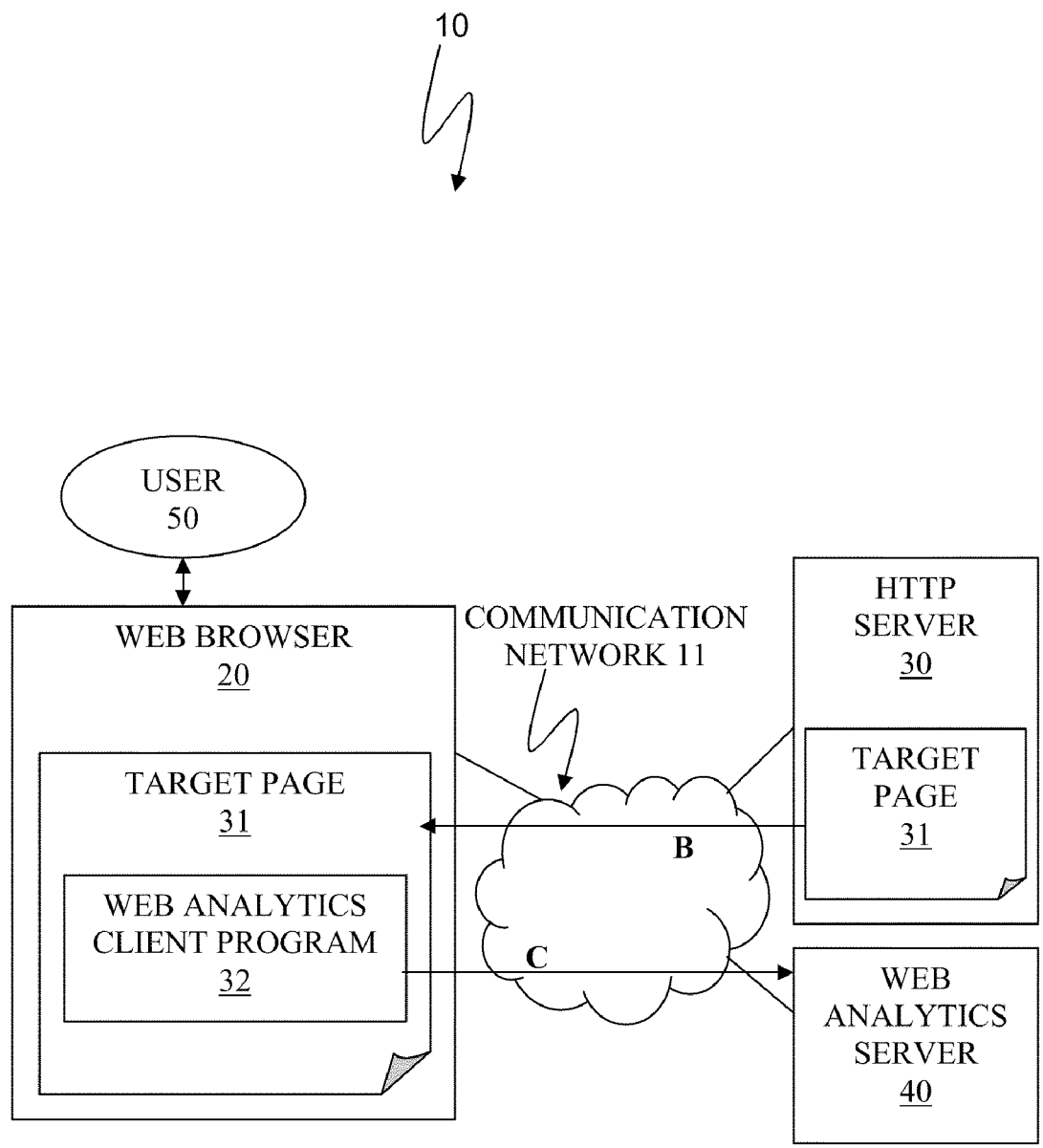

FIGS. 1A and 1B illustrate a system 10 for determining web analytics information, in accordance with embodiments of the present invention.

The system 10 comprises a communication network 11, a web browser 20, a Hypertext Transport Protocol (HTTP) server 30, and a web analytics server 40. The web browser 20, the HTTP server 30, and the web analytics server 40 operate on a computer system 90 of FIG. 4, infra. The web browser 20 communicates with the HTTP server 30 and the web analytics server 40 through the communication network 11. The HTTP server 30 and the web analytics server 40 may share a single hardware platform or may utilize a respective hardware platform. The communication network 11 may be the Internet, an intranet, or a combination thereof.

The HTTP server 30 is a web server program hosting a target page 31. The web analytics server 40 receives and processes web analytics data for a referring page 21. The referring page 21 comprises a target link 22 representing a Uniform Resource Locator (URL) of the target page 31.

A user 50 accesses the referring page 21 and the target page 31 through the web browser 20.

FIG. 1A illustrates the system 10 at time T0, in accordance with the embodiments of the present invention. Time T0 is a point of time when the user 50 activates the target link 22 while browsing the referring page 21. Arrow A indicates a HTTP request for the target page 31 to the HTTP server 30. The web browser 20 generates the HTTP request comprising an origin of the HTTP request information. Consequently, a URL of the referring page 21 is known to the HTTP server. See FIG. 3A for an example of the referring page 21 comprising the target link 22.

FIG. 1B illustrates the system 10 displaying the target page at time T1, in accordance with the embodiments of the present invention. Time T1, subsequent to time T0, is a point of time when the target page 31 is displayed to the web browser 20 by the HTTP server 30. Arrow B indicates a load of the target page 31 from the HTTP server 30 to the web browser 20 according to the target link 22. The target page 31 comprises a web analytics client program 32. The web analytics client program 32 creates web analytics data. The web analytics data comprises a (X,Y) position of a mouse cursor at time T1, dimensions of a window for the web browser 20 as rendered by the target page 31, a type of the web browser 20, and a URL of the referring page 21. Arrow C indicates a transfer of the web analytics data from the web analytics client program 32 to the web analytics server 40.

Figure 2:
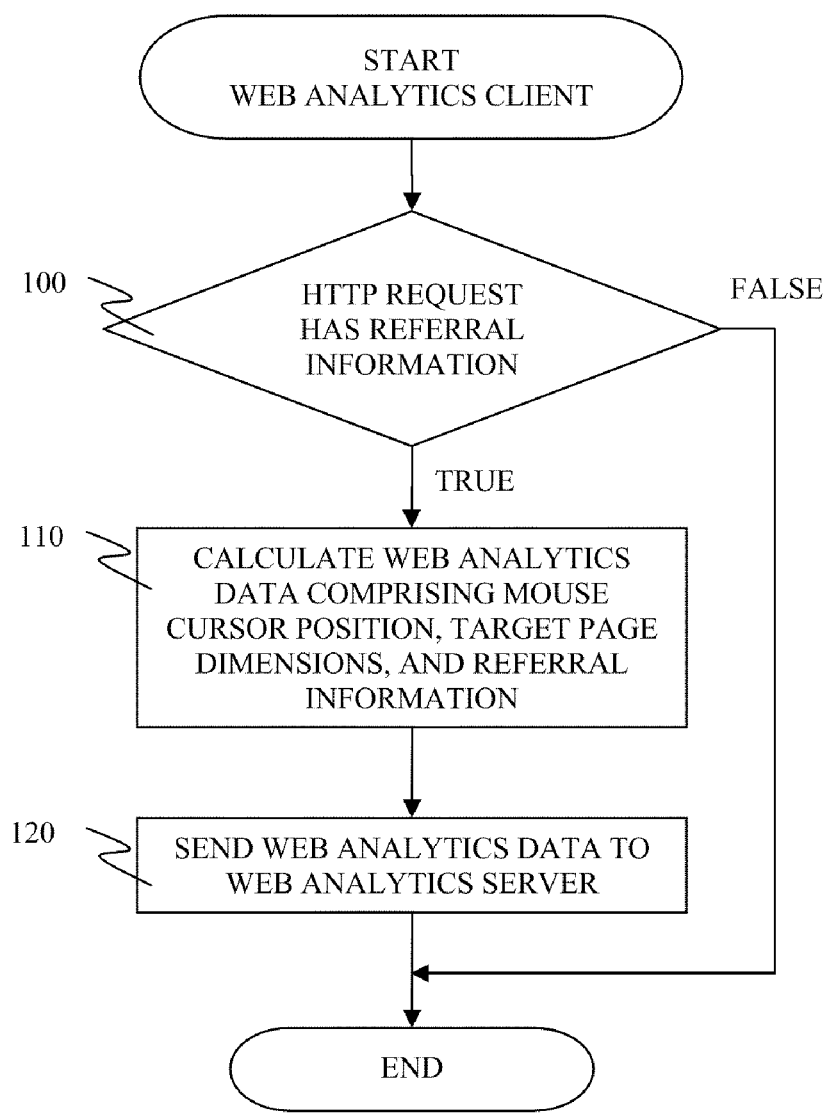
FIG. 2 is a flowchart depicting the method for determining web analytics information, wherein the method is performed by the web analytics client program, in accordance with the embodiments of the present invention.
Figure 3:
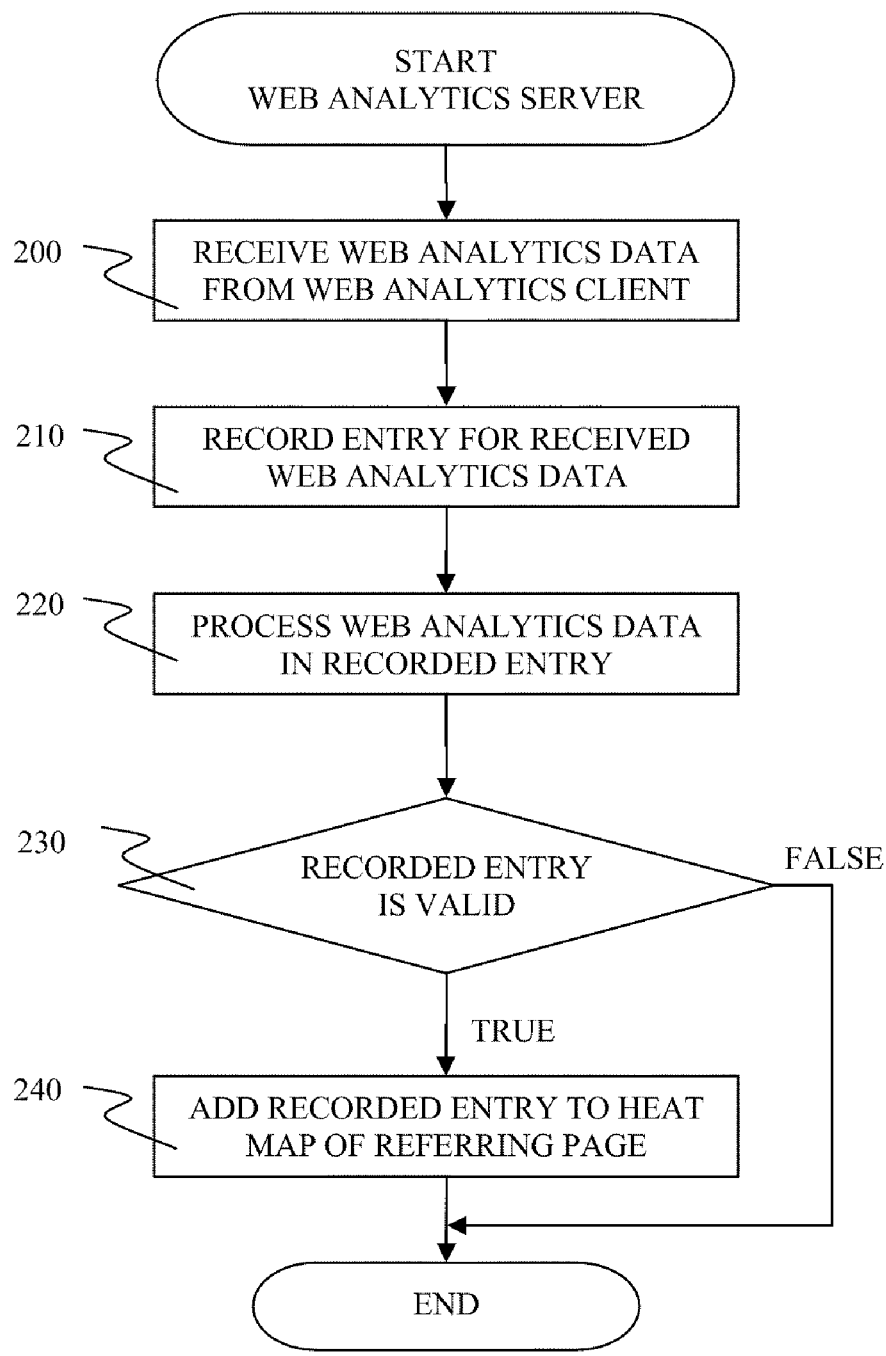
FIG. 3 is a flowchart depicting the method for determining web analytics information, wherein the method is performed by the web analytics server, in accordance with the embodiments of the present invention.

FIGS. 2 and 3 are flowcharts depicting the method for determining web analytics information in a client-server mode, in accordance with the embodiments of the present invention.

In one embodiment of the present invention, a web analytics client program calculates web analytics data in the target page and sends the calculated web analytics data to a web analytics server. See descriptions of FIG. 2, infra, for detailed steps of the web analytics client program.

The web analytics server receives, records, and processes the web analytics data calculated in the target page to establish a heat map of the referring page. See descriptions of FIG. 3, infra, for detailed steps of the web analytics server.

FIG. 2 is a flowchart depicting the method for determining web analytics information, wherein the method is performed by the web analytics client program, in accordance with the embodiments of the present invention.

The web analytics client program starts performing the method described in steps 100, 110, and 120, when a target page with which the web analytics client program is associated is loaded in a web browser. The target page is referred to by a target link in a referring page. When a user of the web browser clicks the target link in the referring page, the web browser sends a HTTP request for the target page to a HTTP server hosting the target page. The HTTP request conveys referral information comprising a URL of the referring page and a URL of the target page. Responsive to the HTTP request, the HTTP server sends the target page referred in the HTTP request to the web browser.

The web browser loads the target page from the HTTP server and displays the target page in the web browser. Browsing the target page by following the target link in the referring page is a part of general HTTP session traffic between the web browser and the HTTP server.

In this embodiment of the present method for determining web analytics information, a mouse cursor position in the target page is used in lieu of a target link position in the referring page. Such approximation is based on the fact that, especially in a high-speed networking environment, when the target page is first loaded in the web browser after the target link is activated in the referring page, a mouse cursor is often at the same position as the target link in the referring page.

In step 100, the web analytics client program determines whether the HTTP request has referral information. The HTTP request has referral information when the target page is referred by the target link from the referring page. If the web analytics client program determines that the HTTP request does not have the referral information, because the target page has not been referred from the referring page, the web analytics client program terminates. If the web analytics client program determines that the HTTP request has the referral information, because the target page is referred by activating the target link in the referring page, the web analytics client program proceeds with step 110 to determine web analytics data.

In step 110, the web analytics client program calculates web analytics data. The web analytics data comprise a (X, Y) position of a mouse cursor when the target page is loaded in the web browser, the width-height dimensions of a window for the web browser that is rendered by the target page, a type of the web browser, and a URL of the referring page.

In step 120, the web analytics client program sends the web analytics data calculated in step 110 to the web analytics server. In one embodiment of the present invention, the web analytics client program creates a HTTP query string comprising the web analytics data and sends the HTTP query string to the web analytics server or to the HTTP server with standard web browser query functionalities. See EXS. 1 and 2 for examples of the HTTP query string.

http://www.ibm.com/us/ [EX 1]

"http://www.ibm.com/us/" is a URL of the web analytics server or the HTTP server.

http://www.ibm.com/us/?ref=www-01.ibm.com/software/rational/rsdc/
&x=42&y=97&width=1024&height=768 [EX 2]

As in EX 1, "http://www.ibm.com/us/" represents the URL of the web analytics server or the HTTP server. "/?ref=www-01.ibm.com/software/rational/rsdc/&x=42&y=97&width=1024&height=768" represents the web analytics data being sent to the web analytics server that comprise the URL of the referring page "www-01.ibm.com/software/rational/rsdc", the (X, Y) position "x=42", "y=97", and the width-height dimensions "width=1024" and "height=768".

In one embodiment of the present invention, the web analytics client program is a JavaScript code embedded in the target page.

FIG. 3 is a flowchart depicting the method for determining web analytics information, wherein the method is performed by the web analytics server, in accordance with the embodiments of the present invention.

In step 200, the web analytics server receives the web analytics data sent by the web analytics client program in step 120, supra.

In step 210, the web analytics server records an entry of the received web analytics data, with a timestamp.

In step 220, the web analytics server read in the recorded entry and processes the web analytics data in the recorded entry.

In step 230, the web analytics server determines whether or not the recorded entry is valid by examining dimensions of a second window area for the target page and a first window area for the referring page. If the web analytics server determines that the second window area for the target page is equal to or larger than the first window area for the referring page, and consequently determines that the recorded entry is valid, then the web analytics server proceeds with step 240. If the web analytics server determines that the first window area for the referring page is larger than the second window area of the target page, and consequently determines that the recorded entry is not valid, then the web analytics server terminates.

In another embodiment of the present invention, prior to step 230, the web analytics server acquires validity information that indicates whether or not the web analytics data of the recorded entry is valid. The validity information is provided by, inter alia, a program that compares the dimensions of respective windows of the referring page and the target page and generates the validity information, a user input comprising the validity information, predefined data comprising the validity information, etc. In step 230 of the same embodiment, the web analytics server determines whether or not the web analytics data in the recorded entry is valid according to the acquired validity information. If the validity information indicates that the web analytics data is valid, then the web analytics server determines that the recorded entry is valid and proceeds with step 240. If the validity information indicates that the web analytics data is not valid, then the web analytics server determines that the recorded entry is not valid and terminates.

In step 240, the web analytics server adds the recorded entry of the target page to a heat map of the referring page. Because the second window area for the target page is equal to or larger than the first window area for the referring page, the mouse cursor position in the target page is meaningful to infer the mouse cursor position of the target link in the referring page. Consequently, the recorded entry of the web analytics data sent from the target page is used to create the heat map of the referring page.

The heat map of a web page shows respective frequency of user click for respective area of the web page. The heat map of the referring page provides web analytics information for the referring page that shows effectiveness of respective link locations on the referring page. Web analytics information of a web page is used in business transactions including, but not limited to, online advertising, link placement, business relationships, customizations based on user referral, etc.

In another embodiment of the present invention, prior to step 240, a recorded entry is screened for consistency of mouse cursor positions, and subsequently discarded if the mouse cursor position is inconsistent with other recorded entries. An inconsistent mouse cursor position indicates that a user had moved the mouse cursor in between clicking the link in the referring page and the web analytic client program of the target page capturing the position of the mouse cursor. Thus, an entry with the inconsistent mouse cursor position does not provide useful web analytics information as to the effectiveness of link locations in the referring page, and consequently there is no need to add the entry to the heat map of the referring page. After discarding the recorded entry, the web analytics server terminates without performing step 240.

Figure 3A:
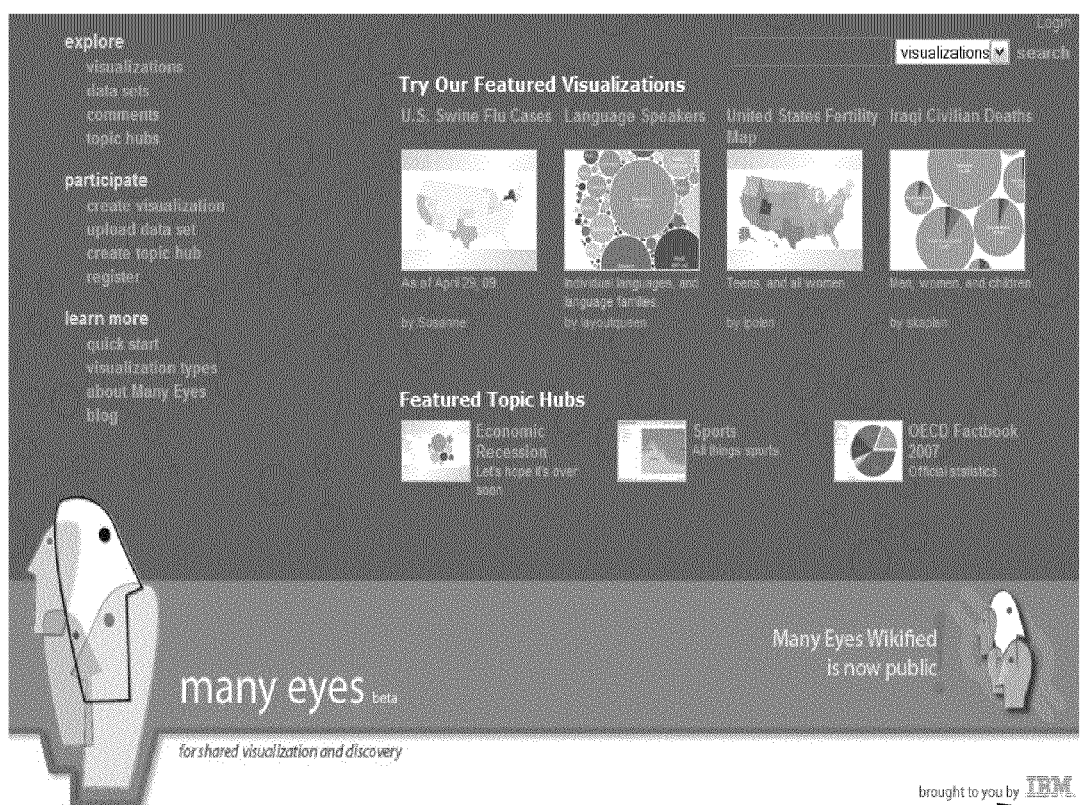
FIGS. 3A and 3B are examples of a referring page and a heat map of the referring page, respectively, in accordance with the embodiments of the present invention.
Figure 3B:
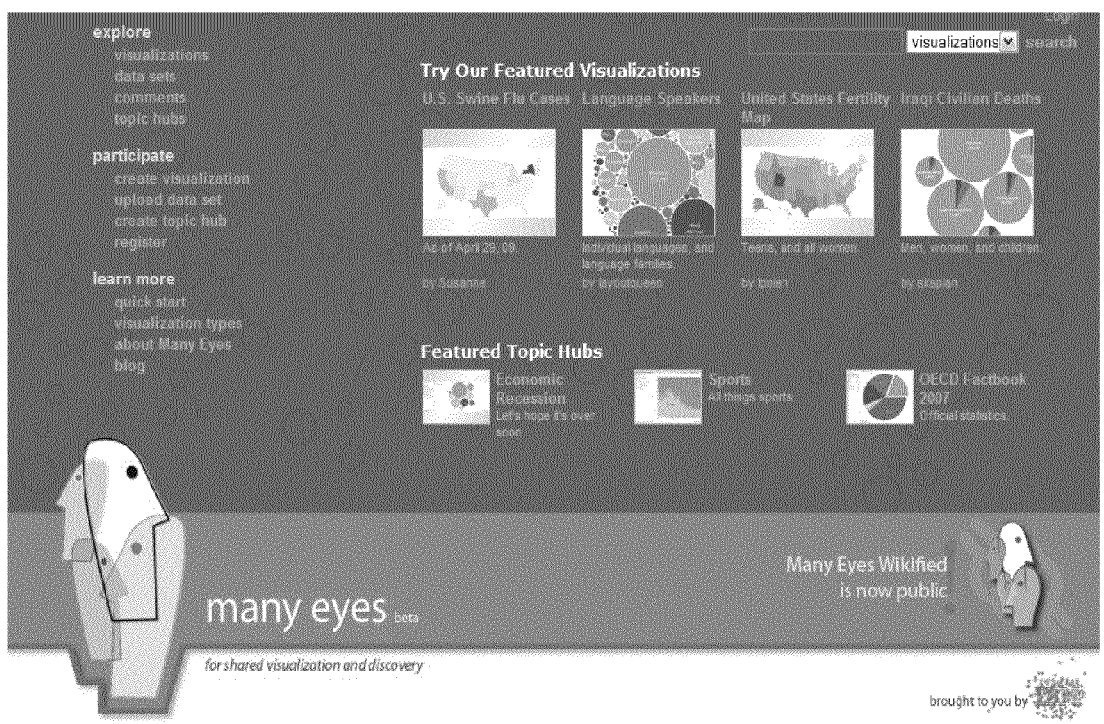

See FIG. 3B for an example of a heat map generated for the referring page 21E of FIG. 3A.

Figure 4:
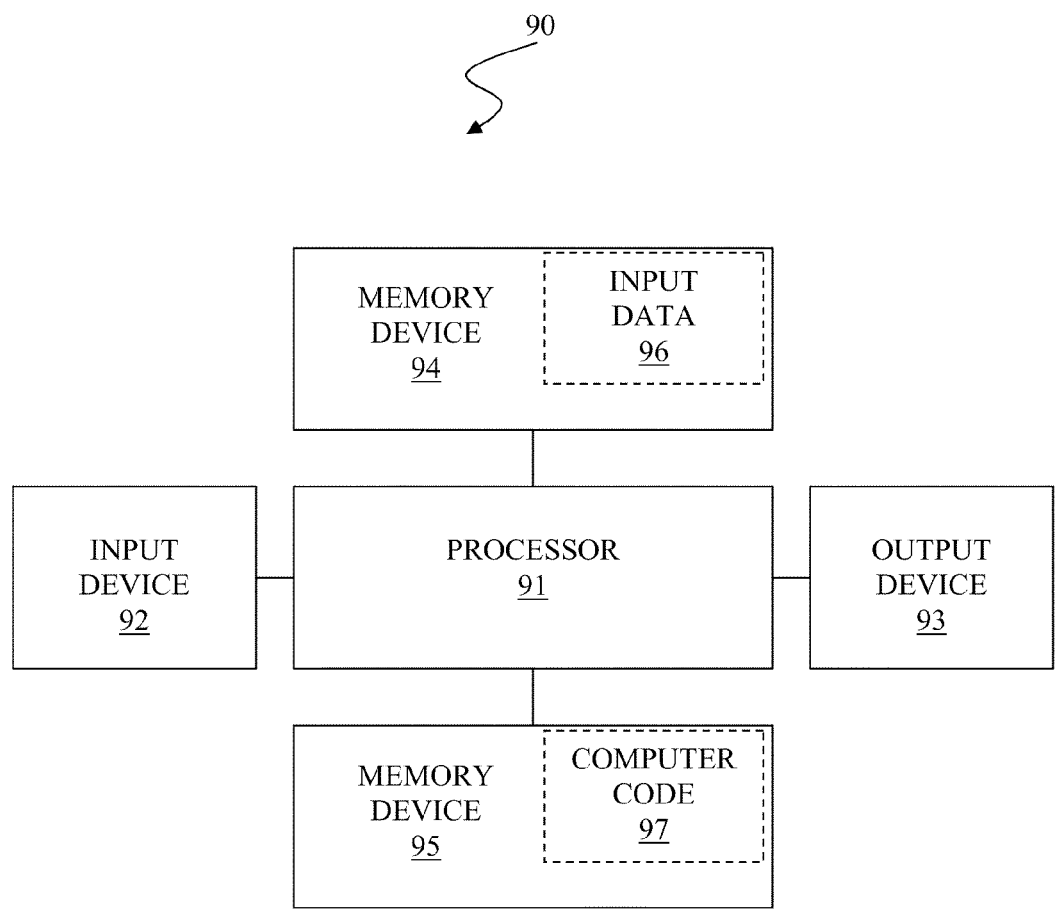
FIG. 4 illustrates a computer system used for determining web analytics information, in accordance with the embodiments of the present invention.

FIG. 4 illustrates a computer system 90 used for determining web analytics information, in accordance with the embodiments of the present invention.

The computer system 90 comprises a processor 91, an input device 92 coupled to the processor 91, an output device 93 coupled to the processor 91, and computer readable memory units comprising memory devices 94 and 95 each coupled to the processor 91. The input device 92 may be, inter alia, a keyboard, a mouse, a keypad, a touchscreen, a voice recognition device, a sensor, a network interface card (NIC), a Voice/video over Internet Protocol (VOIP) adapter, a wireless adapter, a telephone adapter, a dedicated circuit adapter, etc. The output device 93 may be, inter alia, a printer, a plotter, a computer screen, a magnetic tape, a removable hard disk, a floppy disk, a NIC, a VOIP adapter, a wireless adapter, a telephone adapter, a dedicated circuit adapter, an audio and/or visual signal generator, a light emitting diode (LED), etc. The memory devices 94 and 95 may be, inter alia, a cache, a dynamic random access memory (DRAM), a read-only memory (ROM), a hard disk, a floppy disk, a magnetic tape, an optical storage such as a compact disk (CD) or a digital video disk (DVD), etc. The memory device 95 includes a computer code 97 which is a computer program that comprises computer-executable instructions. The computer code 97 includes, inter alia, an algorithm used for determining web analytics information according to the present invention. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 4) may be used as a computer usable storage medium (or a computer readable storage medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable storage medium (or said program storage device).

Any of the components of the present invention can be deployed, managed, serviced, etc. by a service provider that offers to deploy or integrate computing infrastructure with respect to a process for dynamically building a web interface per data collecting rules of the present invention. Thus, the present invention discloses a process for supporting computer infrastructure, comprising integrating, hosting, maintaining and deploying computer-readable code into a computing system (e.g., computing system 90), wherein the code in combination with the computing system is capable of performing a method for determining web analytics information.

In another embodiment, the invention provides a business method that performs the process steps of the invention on a subscription, advertising and/or fee basis. That is, a service provider, such as a Solution Integrator, can offer to create, maintain, support, etc. a process for determining web analytics information of the present invention. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

While FIG. 4 shows the computer system 90 as a particular configuration of hardware and software, any configuration of hardware and software, as would be known to a person of ordinary skill in the art, may be utilized for the purposes stated supra in conjunction with the particular computer system 90 of FIG. 4. For example, the memory devices 94 and 95 may be portions of a single memory device rather than separate memory devices.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer readable program code embodied in the medium.

Any combination of one or more computer usable or computer readable medium(s) 94, 95 may be utilized. The term computer usable medium or computer readable medium collectively refers to computer usable and/or computer readable storage medium 94, 95. The computer-usable or computer-readable medium 94, 95 may be, for example but not limited to, an electronic, magnetic, optical, electromagnetic, infrared, or semiconductor system, apparatus, a device, or any suitable combination of the foregoing. More specific examples (a non-exhaustive list) of the computer-readable medium 94, 95 would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Note that the computer-usable or computer-readable medium 94, 95 could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium 94, 95 may be any medium that can contain, or store a program for use by or in connection with an instruction execution system, apparatus, or device.

Computer code 97 for carrying out operations of the present invention may be written in any combination of one or more programming languages, including an object oriented programming language such as Java, Smalltalk, C++ or the like and conventional procedural programming languages, such as the "C" programming language or similar programming languages. The computer code 97 may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. The term "computer program instructions" is interchangeable with the term "computer code 97" in this specification. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in the computer-readable medium 94, 95 that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for determining web analytics information, said method comprising:
    loading a target page in a web browser upon receiving a Hypertext Transfer Protocol (HTTP) request for a Uniform Resource Locator (URL) of the target page;
    determining that the HTTP request further comprises a URL of a referring page, wherein said referring page comprises a hypertext link representing the URL of the target page, and wherein said hyper text link had been activated by a mouse click such that the target page was loaded in said loading;
    a processor of a computer system calculating web analytics data comprising a (X, Y) position of a mouse cursor within the target page, a tuple (width, height) indicating 2-dimensional size of the target page, and the URL of the referring page; and
    transmitting the calculated web analytics data to a web analytics server executing on another computer system coupled to the computer system through a communication network such that the transmitted web analytics data are utilized to generate said web analytics information that describes properties of hyperlink positions in the referring page.

2. The method of claim 1, further comprising said web analytics server performing the steps of:
    receiving the transmitted web analytics data;
    validating the received web analytics data as valid for said web analytics information; and
    adding the valid web analytics data to said web analytics information, wherein said web analytics information is a heat map of said referring page, the heat map comprising at least one mouse cursor position that a user had clicked in the referring page, said at least one mouse cursor position indicating where the user had clicked to access the URL of the target page.

3. The method of claim 2, said validating comprising ascertaining that the (X, Y) position of the mouse cursor in the target page falls within a first window area of the referring page.

4. The method of claim 2, said validating comprising:
    retrieving 2-dimensional data representing the first window area of the referring page;
    comparing the retrieved 2-dimensional data representing the first window area of the referring page to a second window area of the target page, wherein said second window area of the target page is determined by the received web analytics data; and ascertaining, from said comparing, that the first window area of the referring page falls within the second window area of the target page.

5. The method of claim 2, said validating comprising:
ascertaining that the (X, Y) position of the mouse cursor in the target page falls within a first window area of the referring page; and
ascertaining that the (X, Y) position of the mouse cursor in the target page is identical to the (X, Y) position of the mouse cursor in the referring page.

6. A computer program product comprising:
a computer readable storage device having a computer readable program code embodied therein, said computer readable program code containing instructions that perform the following:
loading a target page in a web browser upon receiving a Hypertext Transfer Protocol (HTTP) request for a Uniform Resource Locator (URL) of the target page;
determining that the HTTP request further comprises a URL of a referring page, wherein said referring page comprises a hypertext link representing the URL of the target page, and wherein said hyper text link had been activated by a mouse click such that the target page was loaded in said loading;
a processor of a computer system calculating web analytics data comprising a (X, Y) position of a mouse cursor within the target page, a tuple (width, height) indicating 2-dimensional size of the target page, and the URL of the referring page; and
transmitting the calculated web analytics data to a web analytics server executing on another computer system coupled to the computer system through a communication network such that the transmitted web analytics data are utilized to generate said web analytics information that describes properties of hyperlink positions in the referring page.

7. The computer program product of claim 6, further comprising said web analytics server performing the steps of:
receiving the transmitted web analytics data;
validating the received web analytics data as valid for said web analytics information; and
adding the valid web analytics data to said web analytics information, wherein said web analytics information is a heat map of said referring page, the heat map comprising at least one mouse cursor position that a user had clicked in the referring page, said at least one mouse cursor position indicating where the user had clicked to access the URL of the target page.

8. The computer program product of claim 7, said validating comprising
ascertaining that the (X, Y) position of the mouse cursor in the target page falls within a first window area of the referring page.

9. The computer program product of claim 7, said validating comprising:
retrieving 2-dimensional data representing the first window area of the referring page;
comparing the retrieved 2-dimensional data representing the first window area of the referring page to a second window area of the target page, wherein said second window area of the target page is determined by the received web analytics data; and
ascertaining, from said comparing, that the first window area of the referring page falls within the second window area of the target page.

10. The computer program product of claim 7, said validating comprising:
ascertaining that the (X, Y) position of the mouse cursor in the target page falls within a first window area of the referring page; and
ascertaining that the (X, Y) position of the mouse cursor in the target page is identical to the (X, Y) position of the mouse cursor in the referring page.

11. A computer system comprising:
a processor and a computer readable storage medium coupled to the processor, said computer readable storage medium containing instructions that when executed by the processor implement determining web analytics information, said determining web analytics information comprising:
loading a target page in a web browser upon receiving a Hypertext Transfer Protocol (HTTP) request for a Uniform Resource Locator (URL) of the target page;
determining that the HTTP request further comprises a URL of a referring page, wherein said referring page comprises a hypertext link representing the URL of the target page, and wherein said hyper text link had been activated by a mouse click such that the target page was loaded in said loading;
calculating web analytics data comprising a (X, Y) position of a mouse cursor within the target page, a tuple (width, height) indicating 2-dimensional size of the target page, and the URL of the referring page; and
transmitting the calculated web analytics data to a web analytics server executing on another computer system coupled to the computer system through a communication network such that the transmitted web analytics data are utilized to generate said web analytics information that describes properties of hyperlink positions in the referring page.

12. The computer system of claim 11, further comprising said web analytics server performing the steps of:
receiving the transmitted web analytics data;
validating the received web analytics data as valid for said web analytics information; and
adding the valid web analytics data to said web analytics information, wherein said web analytics information is a heat map of said referring page, the heat map comprising at least one mouse cursor position that a user had clicked in the referring page, said at least one mouse cursor position indicating where the user had clicked to access the URL of the target page.

13. The computer system of claim 12, said validating comprising
ascertaining that the (X, Y) position of the mouse cursor in the target page falls within a first window area of the referring page.

14. The computer system of claim 12, said validating comprising:
retrieving 2-dimensional data representing the first window area of the referring page;
comparing the retrieved 2-dimensional data representing the first window area of the referring page to a second window area of the target page, wherein said second window area of the target page is determined by the received web analytics data; and
ascertaining, from said comparing, that the first window area of the referring page falls within the second window area of the target page.

15. The computer system of claim 12, said validating comprising:
- ascertaining that the (X, Y) position of the mouse cursor in the target page falls within a first window area of the referring page; and
- ascertaining that the (X, Y) position of the mouse cursor in the target page is identical to the (X, Y) position of the mouse cursor in the referring page.

16. A process for supporting computer infrastructure, said process comprising providing at least one support service for at least one of creating, integrating, hosting, maintaining, and deploying computer-readable code in a computing system, wherein the code in combination with the computing system is capable of performing a method for determining web analytics information, said method comprising:
- loading a target page in a web browser upon receiving a Hypertext Transfer Protocol (HTTP) request for a Uniform Resource Locator (URL) of the target page;
- determining that the HTTP request further comprises a URL of a referring page, wherein said referring page comprises a hypertext link representing the URL of the target page, and wherein said hyper text link had been activated by a mouse click such that the target page was loaded in said loading;
- a processor of a computer system calculating web analytics data comprising a (X, Y) position of a mouse cursor within the target page, a tuple (width, height) indicating 2-dimensional size of the target page, and the URL of the referring page; and
- transmitting the calculated web analytics data to a web analytics server executing on another computer system coupled to the computer system through a communication network such that the transmitted web analytics data are utilized to generate said web analytics information that describes properties of hyperlink positions in the referring page.

17. The process of claim 16, further comprising said web analytics server performing the steps of:
- receiving the transmitted web analytics data;
- validating the received web analytics data as valid for said web analytics information; and
- adding the valid web analytics data to said web analytics information, wherein said web analytics information is a heat map of said referring page, the heat map comprising at least one mouse cursor position that a user had clicked in the referring page, said at least one mouse cursor position indicating where the user had clicked to access the URL of the target page.

18. The process of claim 17, said validating comprising ascertaining that the (X, Y) position of the mouse cursor in the target page falls within a first window area of the referring page.

19. The process of claim 17, said validating comprising:
- retrieving 2-dimensional data representing the first window area of the referring page;
- comparing the retrieved 2-dimensional data representing the first window area of the referring page to a second window area of the target page, wherein said second window area of the target page is determined by the received web analytics data; and
- ascertaining, from said comparing, that the first window area of the referring page falls within the second window area of the target page.

20. The process of claim 17, said validating comprising:
- ascertaining that the (X, Y) position of the mouse cursor in the target page falls within a first window area of the referring page; and
- ascertaining that the (X, Y) position of the mouse cursor in the target page is identical to the (X, Y) position of the mouse cursor in the referring page.

* * * * *